(12) United States Patent
Boeke et al.

(10) Patent No.: US 10,124,641 B2
(45) Date of Patent: Nov. 13, 2018

(54) LEAF SPRING HOLDER FOR THE MOUNTING OF A LEAF SPRING ONTO AN AXLE BODY OF A VEHICLE

(71) Applicant: Benteler Automobiltechnik GmbH, Paderborn (DE)

(72) Inventors: Johannes Boeke, Paderborn (DE); Hendrik Reineke, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/367,850

(22) Filed: Dec. 2, 2016

(65) Prior Publication Data
US 2018/0154722 A1 Jun. 7, 2018

(30) Foreign Application Priority Data
Dec. 4, 2015 (DE) .................. 10 2015 121 189

(51) Int. Cl.
*F16F 1/22* (2006.01)
*B60G 11/113* (2006.01)
*B29C 69/00* (2006.01)

(52) U.S. Cl.
CPC .......... *B60G 11/113* (2013.01); *B29C 69/00* (2013.01); *B60G 2200/31* (2013.01);
(Continued)

(58) Field of Classification Search
CPC ......... B60G 11/04; B60G 11/10; B60G 11/13; F16F 1/20; F16F 1/185
(Continued)

(56) References Cited

U.S. PATENT DOCUMENTS

| 2,241,396 A * | 5/1941 | Fahlstrom et al. ....... B61F 5/32 |
| | | 105/82 |
| 2,920,884 A * | 1/1960 | Rowland ................... F16F 1/20 |
| | | 267/30 |

(Continued)

FOREIGN PATENT DOCUMENTS

| DE | 496 607 A | 4/1930 |
| DE | 41 35 289 A1 | 5/1992 |

(Continued)

OTHER PUBLICATIONS

Duden, Verformung; , https://www.duden.de/rechtschreibung/Deformation; (accessed Feb. 5, 2018), 4 pgs.

(Continued)

*Primary Examiner* — Christopher P Schwartz
(74) *Attorney, Agent, or Firm* — Holland & Hart LLP

(57) ABSTRACT

The present disclosure relates to a leaf spring holder for the mounting of a leaf spring onto an axle body of a vehicle, comprising: a leaf spring saddle configured for mounting of the leaf spring, wherein the leaf spring saddle comprises a saddle surface comprising a deformation; an adaptive molded part configured to be arranged between the leaf spring saddle and the leaf spring, wherein the adaptive molded part seats on the saddle surface via a profile surface, wherein the profile surface comprises an at least partially negative profile of the deformation to increase a contact surface between the leaf spring saddle and the profile surface.

19 Claims, 3 Drawing Sheets

(52) U.S. Cl.
CPC .................. *B60G 2204/121* (2013.01); *B60G 2206/7101* (2013.01); *B60G 2206/8106* (2013.01); *B60G 2206/81012* (2013.01)

(58) Field of Classification Search
USPC ............. 267/36.138, 42, 46, 47, 52, 53, 148
See application file for complete search history.

(56) References Cited

U.S. PATENT DOCUMENTS

| | | | | |
|---|---|---|---|---|
| 4,468,014 A | * | 8/1984 | Strong | F16F 1/22 188/268 |
| 4,519,590 A | * | 5/1985 | Wells | B60G 11/113 267/149 |
| 4,598,900 A | * | 7/1986 | Yamamoto | B29C 53/562 267/149 |
| 4,630,804 A | * | 12/1986 | Fesko | B60G 11/113 264/149 |
| 4,684,110 A | * | 8/1987 | Sale | B60G 11/113 267/148 |
| 4,730,815 A | * | 3/1988 | von Estorff | B60G 11/113 267/148 |
| 4,894,108 A | * | 1/1990 | Richard | B29C 70/24 156/245 |
| 4,895,350 A | * | 1/1990 | Schoof | B60G 11/113 267/52 |
| 5,035,406 A | * | 7/1991 | Sellers | B60G 11/10 267/265 |
| 6,012,709 A | * | 1/2000 | Meatto | B60G 11/04 267/36.1 |
| 2003/0122293 A1 | * | 7/2003 | Akhtar | F16F 1/185 267/36.1 |
| 2011/0221105 A1 | * | 9/2011 | Henksmeier | B60G 9/003 267/52 |

FOREIGN PATENT DOCUMENTS

| | | |
|---|---|---|
| EP | 0 161 155 A1 | 11/1985 |
| EP | 0 240 676 A1 | 2/1987 |
| GB | 542 663 A | 1/1942 |

OTHER PUBLICATIONS

Wipedia: Verformung; https://de.wikipedia.org/w/index.php?title=Verformung&oldid=139707604, (accessed Feb. 5, 2018), 2 pgs.

* cited by examiner

LEAF SPRING HOLDER FOR THE MOUNTING OF A LEAF SPRING ONTO AN AXLE BODY OF A VEHICLE

CROSS-REFERENCE TO RELATED APPLICATIONS

This application claims priority to German patent application No. 10 2015 121 189.0, entitled "Blattfederhalterung zur Halterung einer Blattfeder an einem Achskorper eines Fahrzeugs", and filed on Dec. 4, 2015 by the assignee of this application, the entire disclosure of which is incorporated by reference for all purposes.

BACKGROUND

The present disclosure relates to the mounting of a leaf spring, particularly the centric connecting of a leaf spring, in a vehicle.

A leaf spring, which can be manufactured from a fiber-reinforced plastic, is often used to provide suspension for a wheel of a vehicle, for example in a motor vehicle or in a railway vehicle.

The end of the leaf spring is held by a bearing shoe or a shackle. For the centric mounting of the leaf spring to an axle body, for example to a rigid axle, of the vehicle, however, a leaf spring holder comprising a leaf spring saddle is used. The leaf spring saddle is connected, e.g. welded, to the axle body. The leaf spring is placed centrically on the leaf spring saddle and supported by same.

For production-related reasons, however, the saddle surface of the leaf spring saddle on which the leaf spring rests can be uneven. The saddle surface can thus deform respectively bend, for example during the course of the forming process, due to the leaf spring saddle being stressed, this is known as the so-called spring-back effect. Unevenness can further result from worn tools, from manufacturing tolerances, from die-cutting or from thermal heating of the leaf spring saddle during welding when connecting the leaf spring saddle to the axle body.

Saddle surface unevenness can, however, lead to the development of stress peaks in the leaf spring, these being particularly undesired in the case of leaf springs made from fiber-reinforced plastic.

It is thus the task of the present disclosure to develop a concept for reducing the effect of unevenness in a saddle surface of a leaf spring saddle on the leaf spring.

The subject matter solves this task by means of the features of the independent claims. Advantageous examples of the disclosure constitute the subject matter of the figures, the description and the dependent claims.

SUMMARY

The disclosure is based on the knowledge that unevenness respectively deformations of the saddle surface are to a large extent production respectively process-related and can therefore also be identified in uninstalled leaf spring saddles and thus known at least to some extent beforehand. It is thus possible to at least partly compensate the process-related unevenness by means of an adaptive layer providing an at least partly negative counterpart to the expected unevenness. Placing the adaptive layer with the negative counterpart of an unevenness on the saddle surface with the unevenness increases the contact surface between the saddle surface and the adaptive layer which can result in reducing stress peaks. The leaf spring rests upon the adaptive layer and can be materially bonded thereto.

The adaptive layer can further be manufactured as an adaptive molded part which can be inelastic, since process-related unevenness is at least partly predetermined. Thus, for example, the adaptive molded part can allow for and at least partly compensate different unevennesses correlating to different processes.

According to a first aspect, the disclosure relates to a leaf spring holder for mounting a leaf spring to an axle body of a vehicle which comprises: a leaf spring saddle for the mounting of the leaf spring, wherein the leaf spring saddle comprises a saddle surface comprising a deformation; an adaptive molded part which can be arranged between the leaf spring saddle and the leaf spring, whereby the adaptive molded part seats on the saddle surface via a profile surface, wherein the profile surface exhibits an at least partially negative profile of the deformation in order to increase the contact surface between the leaf spring saddle and the profile surface.

The leaf spring saddle is preferentially made from metal in a manner known per se.

The adaptive molded part is preferentially inelastic, in particular less elastic than an elastomer or rubber.

In one example, the deformation is a production-related and at least partly pre-known deformation, such as for example a spring-back deformation or a punching deformation.

In one example, the negative profile is an at least partial counterpart of the deformation. The deformation counterpart can factor in known, production-related deformations and for example be accepted and produced on the basis of a reference leaf spring saddle.

Allowance can be made for the negative profile in one example by means of an injection mold. The negative profile can however also be produced by stamping or by a mechanical forming or treating of the profile surface.

In one example, the adaptive molded part is formed from an inelastic plastic, particularly an injection molded plastic, from a fiber-reinforced plastic or from a metal such as aluminum, particularly a sheet metal. Thus, the adaptive molded part can itself also advantageously absorb forces in contrast to an elastic material such as elastomer.

In one example, the adaptive molded part is of two-layer configuration, having a first layer comprising the profile surface and a second layer disposed on the first layer. By so doing, different layers can be provided for joining different materials such as metals or fiber composites.

In one example, the first layer is made of metal, particularly a sheet metal, and the second layer is made of elastic or inelastic plastic, particularly a fiber-reinforced plastic. This example is particularly advantageous in the case of leaf springs made from fiber-reinforced plastic.

In one example, the adaptive molded part has a flat supporting surface on the side remote from the profile surface for supporting the leaf spring. So doing realizes an advantageous stress-free support for the leaf spring.

In one example, the adaptive molded part rests on the leaf spring saddle or the adaptive molded part is materially bonded to the leaf spring saddle, or the adaptive molded part is or can be materially bonded to the leaf spring. The respective material bond can be a vulcanized connection.

In one example, the leaf spring holder further comprises a retaining member which is placeable on the leaf spring and connectable to the leaf spring saddle or to the axle body, particularly connectable in a force-fit or form-fit manner. This provides additional retention for the leaf spring.

In one example, the leaf spring holder is provided to centrically hold or support the leaf spring.

According to a second aspect, the disclosure relates to a leaf spring assembly comprising a leaf spring and the leaf spring holder according to the first aspect and its examples, wherein the leaf spring holder is designed to centrically support the leaf spring.

In one example, the leaf spring rests on the adaptive molded part and is materially bonded to the adaptive molded part.

According to a third aspect, the disclosure relates to a leaf spring able to be mounted to an axle body of a vehicle by means of a leaf spring saddle, wherein the leaf spring saddle has a saddle surface comprising a deformation, and wherein the leaf spring comprises an adaptive molded part able to be placed onto the saddle surface via a profile surface, wherein the profile surface comprises an at least partially negative profile of the deformation in order to increase the contact surface between the leaf spring saddle and the profile surface, and wherein the adaptive molded part is materially bonded to a supporting surface with the leaf spring on the a side facing away from the profile surface.

In one example, the adaptive molded part has the features of the adaptive part according to the first aspect or the example of the first aspect.

The leaf spring can thereby be particularly advantageously preassembled together with the adaptive molded part.

In one example, the leaf spring is formed from a fiber-reinforced plastic, whereby the supporting surface is made from plastic, in particular from a fiber-reinforced plastic.

In one example, the negative profile is at least a partial counterpart to the surface profile.

According to a fourth aspect, the disclosure relates to a method of manufacturing a leaf spring holder for mounting a leaf spring to an axle body of a vehicle which comprises: providing a leaf spring saddle for the mounting of the leaf spring, wherein the leaf spring saddle has a saddle surface comprising a deformation; and forming an adaptive molded part able to be arranged between the leaf spring saddle and the leaf spring, whereby a profile surface is formed having an at least partially negative profile of the saddle surface, particularly by means of injection molding or by cutting or milling, in order to increase a contact surface between the leaf spring saddle and the profile surface.

In one example, the adaptive molded part is made from plastic in an injection molding process and/or from metal.

In one example, the adaptive molded part is materially bonded to the leaf spring saddle or to the leaf spring, in particular by welding, adhesively bonding or vulcanization.

BRIEF DESCRIPTION OF THE DRAWINGS

Examples of the principles of this disclosure are depicted in the drawings and will be described in greater detail below.

DETAILED DESCRIPTION OF THE DRAWINGS

Figure 1:
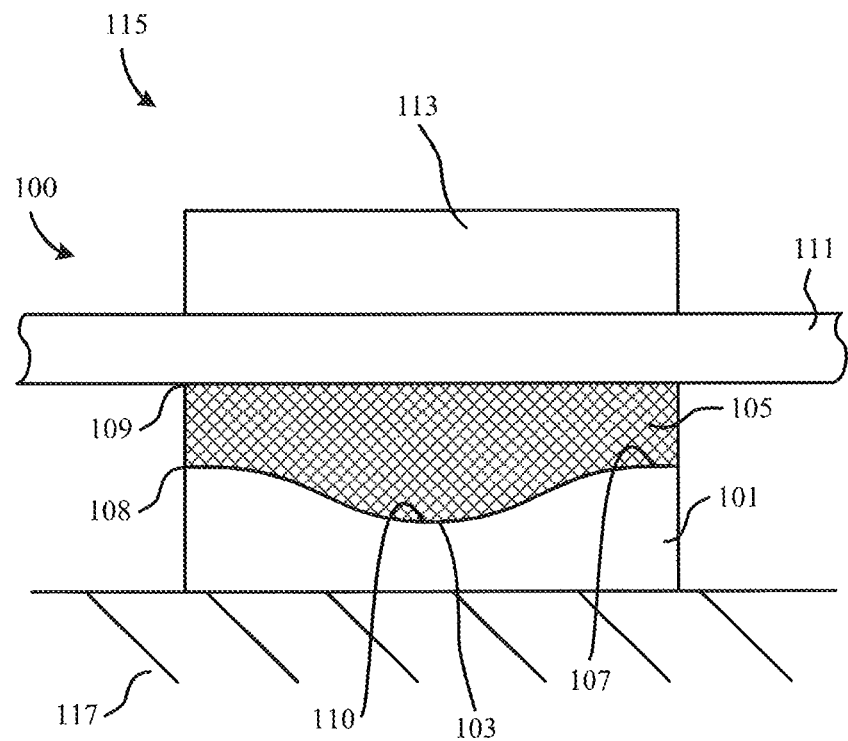
FIG. 1 shows a cross-sectional view of a leaf spring holder.

FIG. 1 shows a leaf spring holder 100 for the mounting, particularly in a centric connection, of a depicted example of a leaf spring 111 to a schematically suggested axle body 117 of a vehicle. The leaf spring holder 100 comprises a leaf spring saddle 101 for the mounting of the leaf spring 111, wherein the leaf spring saddle 101 comprises a saddle surface 107 comprising a deformation 103.

FIG. 1 further depicts an adaptive molded part 105 arranged between the leaf spring saddle 101 and the leaf spring 111.

The adaptive molded part 105 has a profile surface 108 which rests on the saddle surface 107, wherein the profile surface 108 comprises at least one partially negative profile 110 of the deformation 103 in order to increase the contact surface between the leaf spring saddle 101 and the profile surface 108.

The negative profile 110 at least partly resembles the deformation 103, which can be conditional on the manufacturing process, whereby this discourages the occurrence of stress peaks in the leaf spring 111. The negative profile 110 can for example be an at least partial counterpart to the deformation 103.

If the deformation 103 is conditional on the manufacturing, the adaptive molded part 105 with the negative profile 110 can then be prefabricated for those leaf spring saddles manufactured by the same or similar manufacturing processes.

Since manufacturing or process-related unevenness and/or deformation of the leaf spring saddle 101 is able to be known beforehand, the saddle surface 107 contour is or will be precisely plastically adaptively deformed by the adaptive layer provided by the adaptive molded part 105. The side of the adaptive molded part 105 facing the leaf spring 111 is in contrast flat. On the profile surface 108 facing the leaf spring saddle 101, the contoured adaptive molded part 105 is in almost full-surface contact with the saddle surface 107, which reduces the stress peaks and achieves uniform introduction of contact pressure on the leaf spring 111.

The deformation 103 depicted in FIG. 1 is illustrative. The deformation 103 can exhibit any profile which can additionally or alternatively exhibit a protrusion or a further depression or other profiling.

The adaptive molded part 105 further comprises a supporting surface 109 on which the leaf spring rests or contacts respectively. The supporting surface 109 is preferentially flat in order to realize a stress-free support for the leaf spring 111 on the supporting surface 109.

The leaf spring holder 100 in this example further comprises a retaining member 113 which can be placed on the leaf spring 111 and can be force-fit connected to the leaf spring saddle 101 and/or to the axle body 117, for example by means of screws. The axle body 117 can be a rigid axle of a vehicle.

During operation, there is preferably no further plastic or elastic preforming of the adaptive molded part 105. This thus enables a static and dynamic load of the leaf spring 111 to be borne. Moreover, the retaining member 113 can thereby support the force-fit connection, e.g. screwed connection. The adaptive molded part 105 is therefore preferably harder than rubber or elastomer so that there will be as little screwed connection pretensioning loss as possible.

Together with the adaptive molded part 105 and the leaf spring 111, the leaf spring holder 100 depicted in FIG. 1 produces a leaf spring assembly 115.

In one optional example, the adaptive molded part 105 is an element of the leaf spring holder 100 and is for example materially bonded to the leaf spring saddle 101, particularly by means of a vulcanized connection.

Figure 2:
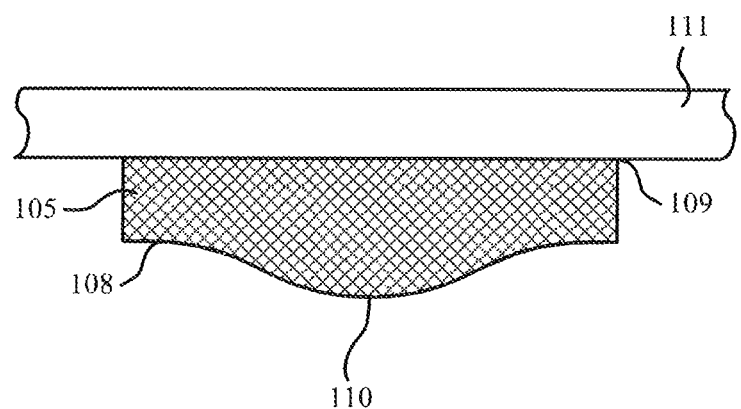
FIG. 2 shows a leaf spring having an adaptive molded part.

In another example, which is depicted in FIG. 2, the adaptive molded part 105 is an element of the leaf spring 111 and is materially bonded to same, particularly by means of a vulcanized connection.

The adaptive molded part 105 can be of single-layer or multi-layer configuration.

Figure 3:
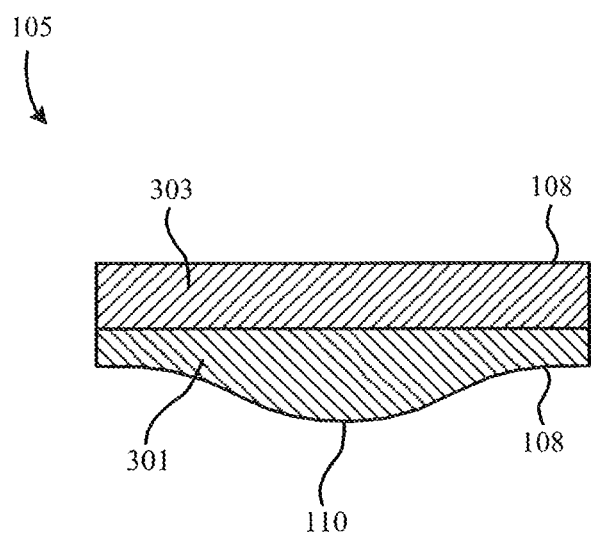
FIG. 3 shows an adaptive molded part according to one example.

FIG. 3 shows a multi-layer configuration of the adaptive molded part 105 having a first layer 301 and a second layer 303 disposed on the first layer 301 and e.g. materially bonded thereto.

The first layer 301 is for example made from metal, particularly a sheet metal, for example an aluminum sheet, and comprises the profile surface 108 with the negative profile 110 of the deformation 103.

The second layer 303 is for example made from plastic, particularly a fiber-reinforced plastic. Being a plastic layer, the second layer 303 thus also serves as a jointing agent between the first layer 301—the metal layer—and the leaf spring 111.

The adaptive molded part 105 has a thickness of for example approximately 5-20 mm.

The adaptive molded part 105 can be formed from plastic or from fiber-reinforced plastic. The adaptive molded part 105 can for example be manufactured by injection molding and, in a subsequent manufacturing step, applied to the leaf spring 111 by means of adhesive or vulcanization.

The joining of the adaptive molded part 105 and the leaf spring 111 can be advantageously integrated into a for example last step of the leaf spring 111 manufacturing process, e.g. by for example adhesive bonding or vulcanization subject to the heat of a furnace in which the resin of the leaf spring 111, formed e.g. from GRP, is cured.

The adaptive molded part 105 can also be formed from metal, particularly a sheet metal. The sheet metal can for example be forged so as to form a contouring on the profile surface 108 side facing the leaf spring saddle 101 and can still remain flat on the side facing the leaf spring 111. Conceivable materials hereto are any type of steel, aluminum, etc. The sheet metal can be adhesively bonded onto the leaf spring 111.

What is claimed is:

1. A leaf spring holder for mounting a leaf spring onto an axle body of a vehicle, comprising:
    a leaf spring saddle configured for mounting of the leaf spring, wherein the leaf spring saddle comprises a saddle surface comprising a production-related deformation, wherein the deformation comprises one or more of: a spring-back deformation or a punching deformation;
    an adaptive molded part configured to be arranged between the leaf spring saddle and the leaf spring, wherein the adaptive molded part seats on the saddle surface via a profile surface, wherein the profile surface comprises an at least partially negative profile of the deformation to increase a contact surface between the leaf spring saddle and the profile surface.

2. The leaf spring holder according to claim 1, wherein the at least partially negative profile is an at least partial counterpart to the deformation.

3. The leaf spring holder according to claim 1, wherein the adaptive molded part is formed from one or more of: an inelastic plastic, an injection molded plastic, a fiber-reinforced plastic, or a sheet metal.

4. The leaf spring holder according to claim 1, wherein the adaptive molded part comprises a single-layer or a dual-layer configuration, the dual-layer configuration having a first layer comprising the profile surface and a second layer disposed on the first layer.

5. The leaf spring holder according to claim 4, wherein the first layer is formed from a sheet metal, and wherein the second layer is formed from an elastic or inelastic plastic.

6. The leaf spring holder according to claim 1, wherein the adaptive molded part comprises a supporting surface facing away from the profile surface to support the leaf spring, wherein the supporting surface is flat.

7. The leaf spring holder according to claim 1, wherein the adaptive molded part is displaceably seated on the leaf spring saddle, or wherein the adaptive molded part is materially bonded to the leaf spring saddle, or wherein the adaptive molded part is materially bonded to the leaf spring.

8. The leaf spring holder according to claim 1, further comprising a retaining member configured to be placeable on the leaf spring and connectable to the leaf spring saddle or to the axle body, wherein the retaining member is connectable in a force-fit or form-fit manner.

9. The leaf spring holder according to claim 1, wherein the adaptive molded part is further configured to centrically hold or support the leaf spring.

10. The leaf spring holder according to claim 1, wherein the leaf spring holder is part of a leaf spring assembly comprising a leaf spring and the leaf spring holder, wherein the leaf spring holder is configured to centrically support the leaf spring.

11. The leaf spring assembly according to claim 10, wherein the leaf spring rests on an adaptive molded part.

12. A leaf spring configured to be mounted to an axle body of a vehicle with a leaf spring saddle wherein the leaf spring saddle has a saddle surface comprising a production-related deformation, wherein the deformation comprises one or more of: a spring-back deformation or a punching deformation, and wherein the leaf spring comprises an adaptive molded part configured to be placed onto the saddle surface via a profile surface, wherein the profile surface comprises an at least partially negative profile of the deformation to increase a contact surface between the leaf spring saddle and the profile surface, and wherein the adaptive molded part is materially bonded to a supporting surface with the leaf spring on a side facing away from the profile surface.

13. The leaf spring according to claim 12, wherein the leaf spring and the supporting surface are formed from a fiber-reinforced plastic.

14. A method of manufacturing a leaf spring holder for mounting a leaf spring onto an axle body of a vehicle, comprising:
    providing a leaf spring saddle for the mounting of the leaf spring, wherein the leaf spring saddle has a saddle surface comprising a production-related deformation, wherein the deformation comprises one or more of: a spring-back deformation or a punching deformation; and
    forming an adaptive molded part configured to be arranged between the leaf spring saddle and the leaf spring, wherein a profile surface of the adaptive molded part is formed having an at least partially negative profile of the saddle surface by one of: injection molding, cutting, or milling, to increase a contact surface between the leaf spring saddle and the profile surface.

15. The method of manufacturing according to claim 14, wherein the adaptive molded part is formed from one or both of: plastic in an injection molding process or from metal.

16. The method of manufacturing according to claim 14, wherein the adaptive molded part is materially bonded to the leaf spring saddle or to the leaf spring, wherein the material bond is formed by one of: welding, adhesively bonding, or vulcanization.

17. The method of manufacturing according to claim 14, further comprising forming the leaf spring and the supporting surface out of a fiber-reinforced plastic.

18. The method of manufacturing according to claim 14, further comprising forming a retaining member configured to be placeable on the leaf spring and connectable to the leaf spring saddle or to the axle body.

19. The method of manufacturing according to claim 18, wherein the retaining member connects in a force-fit or form-fit manner.

* * * * *

UNITED STATES PATENT AND TRADEMARK OFFICE
CERTIFICATE OF CORRECTION

PATENT NO.        : 10,124,641 B2                                     Page 1 of 1
APPLICATION NO.   : 15/367850
DATED             : November 13, 2018
INVENTOR(S)       : Boeke et al.

It is certified that error appears in the above-identified patent and that said Letters Patent is hereby corrected as shown below:

On the Title Page

(72) Inventor should read:
Johannes Böke, Blomberg (DE)
Hendrik Reineke, Bad Driburg (DE)

Signed and Sealed this
Eighth Day of January, 2019

Andrei Iancu
*Director of the United States Patent and Trademark Office*